SELF-PROGRAMMING PATTERN RECOGNITION MACHINE

Filed Sept. 18, 1961 3 Sheets-Sheet 1

INVENTOR
Jacob Rabinow
BY Joseph A. Genovese & Max L. Libman
ATTORNEYS

INVENTOR

Jacob Rabinow

BY Joseph A. Genovese & Max L. Libman

ATTORNEYS

SELF-PROGRAMMING PATTERN RECOGNITION MACHINE

Filed Sept. 18, 1961 3 Sheets-Sheet 3

INVENTOR
Jacob Rabinow
BY
Joseph A. Genovese & Max L. Libman
ATTORNEYS

United States Patent Office 3,237,161

Patented Feb. 22, 1966

3,237,161
SELF-PROGRAMMING PATTERN RECOGNITION MACHINE

Jacob Rabinow, Takoma Park, Md., assignor, by mesne assignments, to Control Data Corporation, Minneapolis, Minn., a corporation of Minnesota Filed Sept. 18, 1961, Ser. No. 138,777
21 Claims. (Cl. 340—146.3)

This invention relates to reading machines, and particularly to self-programming or self-wiring character readers.

There are several main character reading techniques being used at the present time, and two of these are often referred to as "stroke analysis" and "map matching," respectively. Machines using either technique require a decision section which determines the identity of the characters on the basis of its incoming character-configuration data. Some machines have absolute decision sections, i.e., where a character is identified on the basis of the presence of specific signals corresponding to a number of features, points, elements, lines, etc., peculiar to a given character without appreciable regard to other characters. Such machines ordinarily have difficulty in distinguishing between certain characters closely resembling one another. Other machines rely on a "best match" technique which determines the identity of a character by concluding that the unknown character is more like a particular known character than any other character.

Stroke analysis machines and map matching machines have difficulty in recognizing characters of different size and/or proportions. For example, a map matching machine would ordinarily have great difficulty in identifying an "A" which is printed in 3 x 5 font (three units wide and five units tall) and also an "A" which is printed in 4 x 9 font. Using a best match decision instead of an absolute decision helps somewhat, but is not a completely satisfactory solution since there are practical cost limits within which the machine must be constructed.

The size and cost problem is aggravated if one reading machine is expected to read characters of considerably different fonts, for instance block letters, upper and lower case letters, script characters and characters of different languages. A map matching machine may be constructed to do this, but it would be expensive and enormous if made in accordance with present technology. The reason is that nearly all of the characters of each font would have to be provided for in the decision section of the machine.

An object of my present invention is to provide a facility as a part of a reading machine or as an attachment to any compatible reading machine, to enable the machine to be uniquely programmed to (a) recognize characters whose physical proportions differ, e.g., the example of the "A's" given above, and/or (b) enable the machine to be programmed to recognize characters whose physical appearance is considerably different, e.g., upper and lower case characters, block letters, picas, etc., during the time that a document (or documents) containing such characters are being read.

A feature of my invention is that the program means "rewire" the machine exactly in accordance with sample characters or characters on the document itself. Thus, the same machine can be programmed to read many fonts and, as shall later be seen, it may be programmed for only those characters which actually appear on the documents being read.

Although my invention may be applied to stroke analysis machines, map matching machines and others, and may be used with machines having an absolute or "best match" decision section, the following description deals only with map-matching machines having a best match decision section. The only reason for this is to simplify the disclosure so that my "self-wiring" or "self programming" features will not be obscured.

Accordingly, I shall discuss the operation and principles of a map matching reading machine which I helped to construct. For a full explanation refer to Patent No. 3,104,369 of Rabinow et al. In that machine dark ("black") characters on a light ("white") background are scanned, and the scanner outputs are temporarily stored in a register. The register provides outputs which signify the presence of points of the character image, or its background, which are summarized in a correlation section composed of a single resistor matrix for each character in one position in the matrix. The matrices are so wired with the register output terminals that they summarize the register outputs and provide match voltage signals one from each matrix) which are compared. The best match voltage signals are considered by the comparator in such a way that a "one shot" output signal identifies the unknown character.

As applied to a machine such as this, another object of my invention is to provide means for establishing circuit paths (wiring) between selected points of the register and the resistors of one resistor matrix for a given character, after which other points for another character (often including some of those previously used) of the register are wired with the resistors of another matrix, for another character, etc.

As I have previously stated, the machine disclosed in Patent No. 3,104,369 is given only as background material, and my present invention is not limited thereto. For example, the machine need not be a map matching machine, nor use a best match decision, nor a point-by-point or line-by-line sequential scanner. The machine need not have a storage register, for instance, I may use a single presentation scanner such as shown in Patent No. 3,201,751 and obtain the "white" and "black" information directly from the photocell amplifiers of the scanner.

It has been proposed to provide separate register matrices for each kind of character-group which is being read. Switching between matrices or groups of matrices enables the proper matrices to function for different fonts or types of characters, etc., numerals, symbols, or letters. Such a system will serve the purpose of allowing a single reading machine to recognize different fonts and kinds of characters, but it requires an enlarged correlation section. In my present invention, the numbers of matrices required to recognize characters of different fonts, kinds, etc., is not increased. Instead of having separate resistor matrices for each character of every font or, at best, sharing a few matrices for individual characters, my present invention establishes different circuit paths between individual resistors of the matrices and points of the register, depending on the configuration of the character image first appearing in the register.

The operating principle of my present invention is to establish the same type of wiring connections between the resistors of the matrices and the register as in Patent No. 3,104,369 or in Patent No. 3,201,571, automatically, or semi-automatically in accordance with what the scanner sees (and hence the register stores) when a character is "initially" presented to view of the character. By "initially" I mean that when a specific character, for example the number "1," first appears in the view of the scanner, a resistor matrix for that numeral becomes automatically wired with the correct register points corresponding to the "blacks" and "whites" stored therein. Subsequent presentation of another numeral "1" to the view of the scanner will not alter the wiring connections that have been previously established. But, when a different numeral, letter, symbol, etc., comes into view of the scanner, e.g., a "P," another resistor matrix for the new character is automatically wired. This procedure continues until all of the characters which the reading machine is expected to read have had a single resistor matrix wired especially for it.

There are two main procedures, described herein, for wiring the resistor matrices. One is to have the scanner see a sample line of all of the characters which the machine is expected to read. The wiring procedure may be manually triggered, for instance by closing switches, or may be semi-automatically triggered for instance, by a switch operated by a stepper or indexer. Such a procedure is practical in all cases where a sample line of characters is available. In many cases such a sample line is not available and my automatic system (described below) will be used.

The automatic system for programming or wiring the reading machine is to scan the entire document containing the characters. The first character of the document which is presented to the view of the scanner will cause a resistor matrix for that character to be wired. However, the second character read by the machine will trigger the procedure for final wiring of another matrix only if the second character is different from the first. The third character will cause another matrix to be finally wired, provided that it is not the same as one of the first two characters. This procedure continues until all of the characters to be recognized have caused a resistor matrix to be properly wired for the recognition of subsequent similar characters. This procedure has the interesting advantage of wiring only those characters of any font which the matchine sees, and these may be completely intermixed. For instance, a "run" of documents may contain ten numerals and, in all, seventeen lower case letters, twelve capital letters, four capital block letters and nine Greek letters. In all, fifty two matrices will be wired to recognize these characters, and no more. The next "run," say a week later, may contain thirty printed characters and two handwritten numbers, and my machine will require itself to recognize only these thirty-two characters and no others. In brief, my machine wires matrices to order of the characters themselves.

I am aware of prior proposals for "self learning" machines where the objective is to have each character that is read "reward' or "penalize" the memory and decision section of the machine. Presumably, this is a continual procedure of revising the machine memory to recognize many variations of the same character and/or many different characters. My invention basically differs from such concepts by establishing rigorous wiring connections to establish recognition circuits for specific patterns. Once they are established for a given character, there is no automatic and constant changing of the wiring connections. This, of course, applies until such time that the machine operator decides that the wiring connections should be changed. In principle, I endeavor to establish the morst favorable conditions for a given font or intermixed characters of more than one font in the machine and retain that most favorable condition for the characters being read. When a different parameter of characters must be read, the wiring connections are re-established, at the discretion of the machine operator.

The Fitch Patent No. 2,682,043 bears a resemblance to my invention because I have elected to show relay banks as a part of the control section of my invention. Relays are practical in my application because the wiring connections may be established comparatively slowly. Once the machine is wired for a given group of characters it may be operated at its design speed (independent of the relay banks) for days, weeks, or years before the wiring must be changed to accommodate a different "run" of documents containing different characters.

The Fitch patent discloses an analysis machine where the relays establish a plurality of parallel circuits between them to feed a cross-grid network (analyzing circuits) and provide an output indicating the character which is being read. Plugboard jumpers are manually used to enlarge the scope of recognition for a given character which is being read. In the normal operation of the Fitch machine the relays play an integral and inseparable part in the recognition of every character. On the other hand, my machine uses relay banks merely to establish wiring connections between a register and a correlation matrix for each character, after which the machine operates at its own inherent speed, which is usually enormous in comparison to the speed of electro-mechanical relay circuits.

Accordingly, a further object of my invention is to provide a self-wiring facility in an otherwise conventional reading machine, whereby circuit paths determined by the configuration of sample characters (or characters of the document actually being read) are established, after which the self-wiring feature remains inactive until the operator decides that the machine will be used for reading a different font, different symbols, letters, numerals, etc.

As I use the term "character" herein, it is defined as optical or magnetic letters, numerals, symbols and any pattern or portion thereof capable of being identified by a reading machine. Thus, instead of repeating all of the alternatives throughout the specification and claims, the term "character," as defined above, is used for brevity.

Other objects and features of importance will become evident in following the description of the illustrated forms of the invention.

Figure 1:
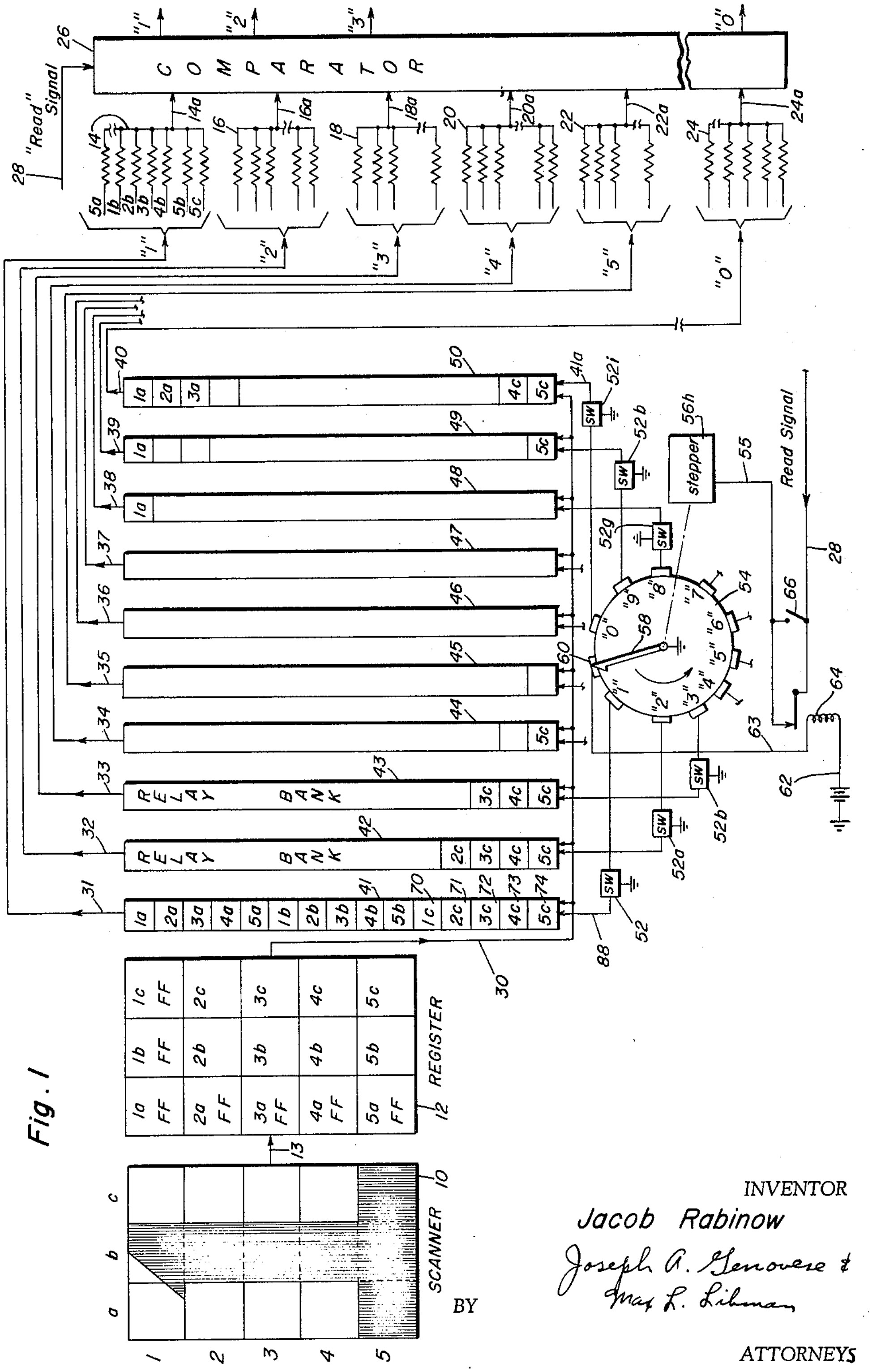
FIGURE 1 is a diagrammatic view showing a comparatively simple form of my invention providing for manual or semi-automatic programming of a reading machine to recognize characters.
Figures 3, 3A, 3B, 3C:
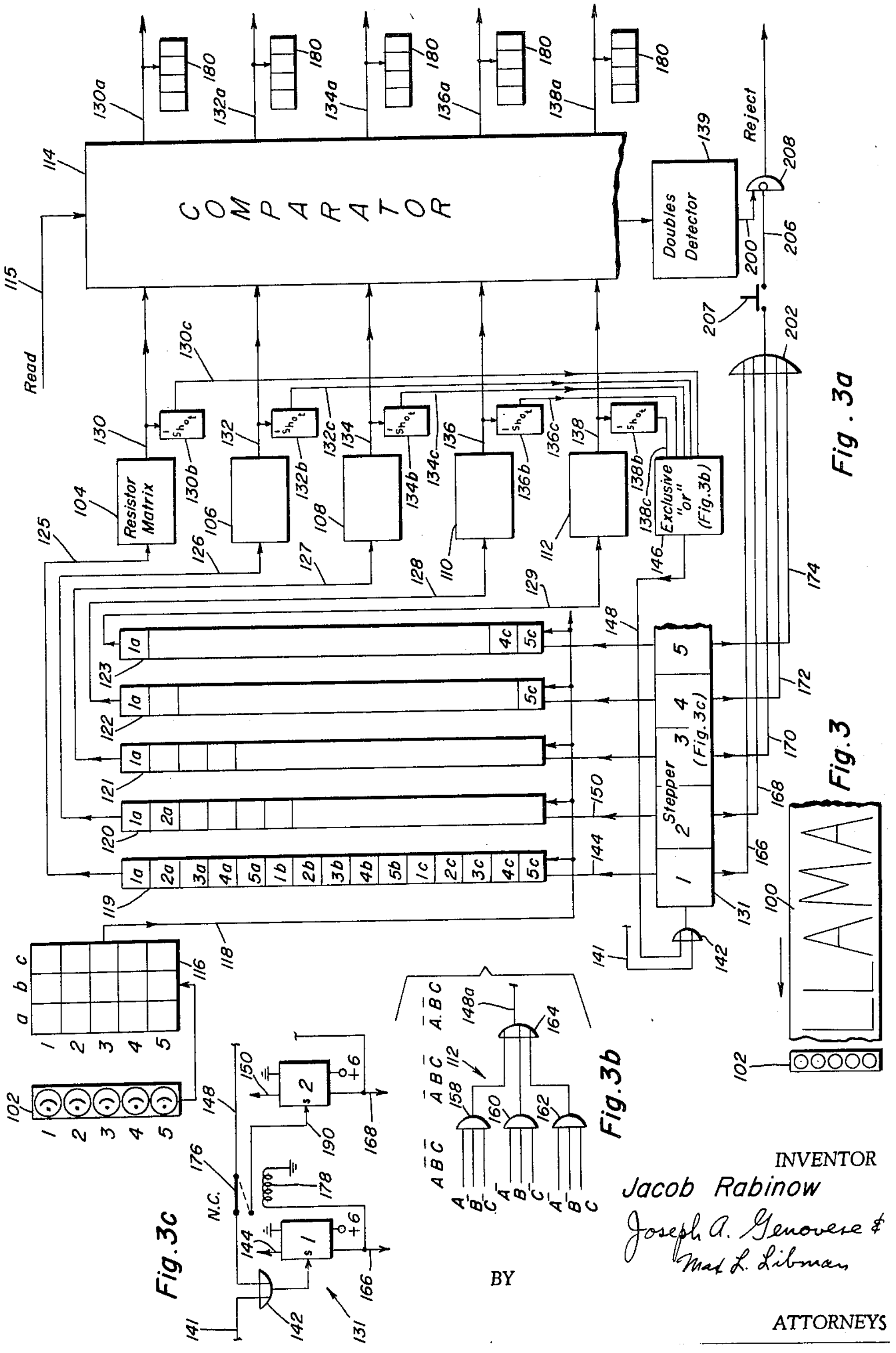
FIGURE 3 is a diagrammatic elevational view showing a sample line of characters of a document, a scanner made of a vertical row of photocells.

FIGURE 3*a* is a diagrammatic view of fragmentary parts of a reading machine together with automatic means for self-wiring the resistor matrices with the register of the reading machine, this view further showing correspondence between conventional computer technology components and electro-mechanical components, and showing also that different types of scanners, e.g., a full examination device as in FIGURE 1, or a line examination device as in FIGURES 3 and 3*a*, may be used.

FIGURE 3*b* shows an exclusive OR gate for a plurality of input signals.

FIGURE 3*c* shows a relay stepper circuit for the automatic form of my invention.

*General*

Figure 2:
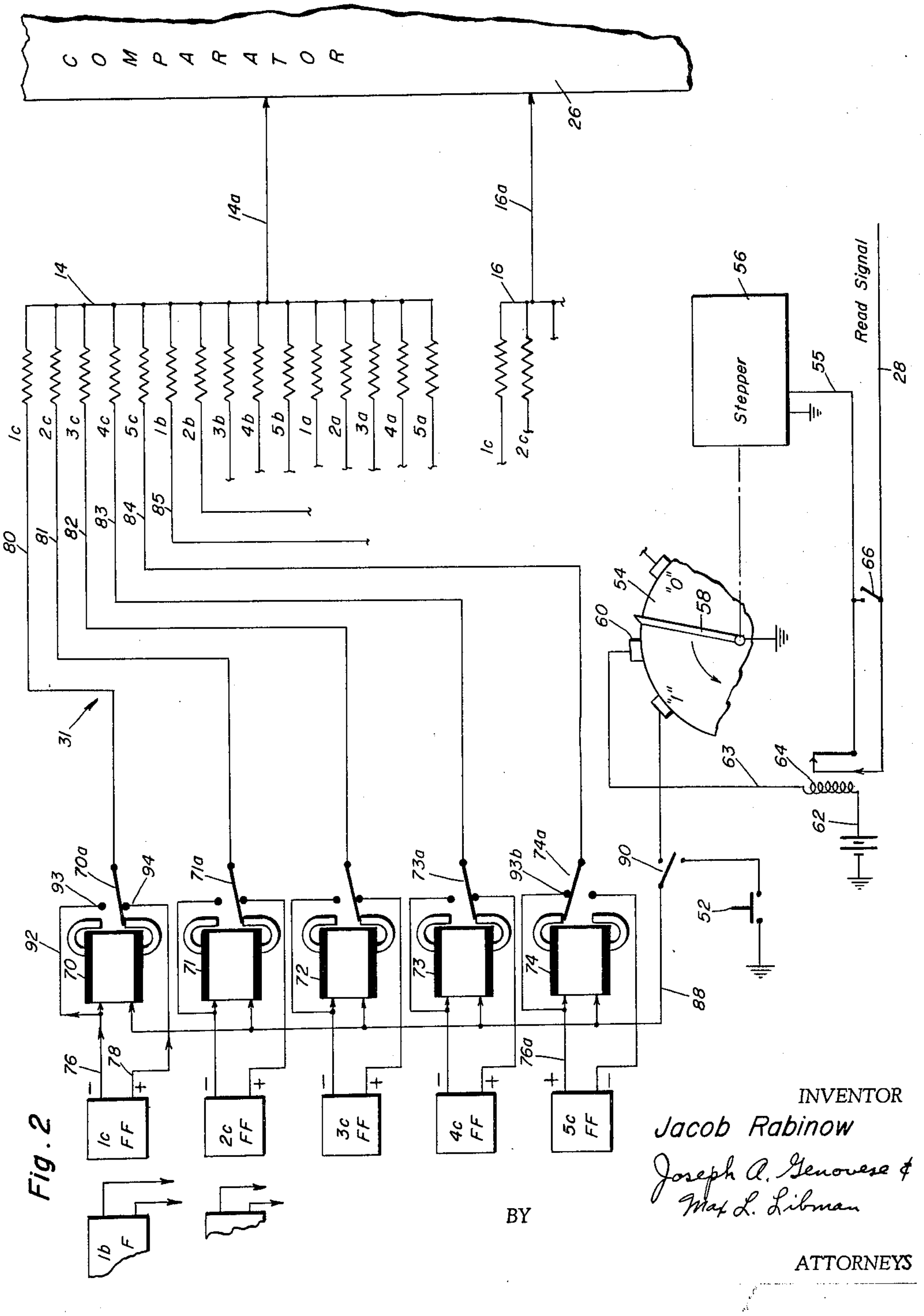
FIGURE 2 is a more detailed diagrammatic view showing a portion of one relay bank, a portion of the reading machine register, a correlation matrix, and a part of the comparator for the reading machine, together with the optional manual means for triggering the relay banks, and the semi-automatic means to serve the same purpose.

FIGURES 1 and 2 show the manually controlled and semi-automatic forms of my self-wiring system for Reading Machines, while FIGURE 3*a* shows my fully automatic system. Each system achieves the same broad objectives, but in slightly different ways.

As I have discussed, my self-programming systems may be applied to many reading machines of different types and designs, but I have selected the machine disclosed in Patent No. 3,104,369 as a typical reading machine with which my invention may be used.

To further emphasize the non-dependence of my invention on any single kind of reading machine, FIGURE 1 (herein) shows scanner 10 arranged as a mosaic of photocells **1*a*–5*c* inclusive which makes a full examination on the character and its background, as opposed to the scanner 102** (FIGURES 3 and 3*a*) which is composed of a line of photocells whose outputs are gated into a register (as in Patent No. 3,104,369) a number of times and at different adjacent positions of each character and its background.

The scanner outputs are applied to a register, such as a flip flop register 12 (FIGURES 1 and 2) or register 116 FIGURE 3*a*. When a photocell associated with a particular flip flop, e.g., photocell 5*c* (FIGURE 1) sees a part of the character, the flip flop (5*c* of register 12) is actuated in such a way to reflect this. When a photocell, e.g., 4*c*, sees a part of the character background, its corresponding flip flop (4*c* in register 12) remains in its initial state (as in Patent No. 3,104,369) or alternatively it becomes actuated to its second state thereby indicating that the photocell has detected the background of the character. The flip flops are so designed that each provides two outputs, e.g., on wires 76 and 78 of FIGURE 2, and the voltage level or polarity between them shifts, say from +6 v. to −6 v. when the photocells see the character or its background respectively. Since my invention does not rely on a specific register 12, further details of the register may be obtained from Patent No. 3,104,369. In fact, in place of register 12, I could use one or more of the systems disclosed in the Patent No. 3,104,372, where the flip flops (or the equivalent) provide a plurality of outputs representing shades of gray as well as "black" and "white." I realize that total light absorption to produce true "black" and complete light reflection to provide true "white" will not exist in reading ordinary printed characters, but these terms are used as a matter of language convenience. While discussing registers, I want to make it clear that it is not even necessary to use a register in the practice of my invention. For example, I may use a machine without a register memory, such as disclosed in Patent No. 3,102,571.

The register of a reading machine merely provides a convenient place in the reading machine to connect my self programming facility.

In a "conventional" reading machine such as disclosed in Patent No. 3,104,369, rigid wiring connections are made between selected points of the register 12 and resistors of correlation matrices, e.g., matrices such as 14–24 which I show herein. There is one resistor matrix for each character. Each matrix is so wired with the register that it will provide a correlation output signal proportional to the degree of match between the scanned character and the various matrices (as wired with the register) for the characters that the machine is expected to identify. The output signals on lines 14*a*, 16*a*, . . . 24*a* from the resistor matrices are compared, by comparator 26 and the scanned character is identified on the basis of the comparison. Here again, my invention may be used with reading machines which do not use resistor matrices, e.g., the resistor matrices could be replaced by magnetic cores as in Patent No. 3,184,712.

Summarizing, although my invention can be used with many machines such as those briefly discussed above, the general use of my invention is to self-program or self-wire a reading machine for different characters. One specific application of this principle is to substitute a self-wiring facility between the register (or other source of stored scan data) and correlation matrices (or the equivalent) of a reading machine. This enables one reading machine to be used to identify many more characters and/or characters which have the same meaning but which vary in size, proportions, etc.

*Manual system*

FIGURES 1 and 2 show both the manually actuated and semi-automatic (described under the next sub-title) forms of my self wiring system. The manual form is a subcombination of the semi-automatic system, requiring only portions of FIGURES 1 and 2.

The photocells of scanner 10 have their amplified outputs conducted over wires in cable 13 to corresponding flip flops of register 12. Thus, when the image of a character, e.g., the numeral "1" is projected onto the scanner 10, some of the flip flops will be set and others will be (or remain) reset depending on whether the associated photocells see "black" or "white" respectively. In the example (FIGURE 1), flip flops 1*b*–5*b* inclusive, 5*a* and 5*c* will be set, while all of the others will be reset or simply remain reset if already in that state. Thus, the set and reset conditions of the flip flops will effectively store an image of the scanned character. The usual or "conventional" machine would have a "1" resistor matrix with individual wires connected between its resistors and the "black" outputs of flip flops 1*b*–5*b*, 5*a* and 5*c*. Other matrices for other characters would have rigid wiring connections to different flip flops depending on the shape of the characters for which the matrices are wired. My self wiring system does not have such rigid wiring.

Instead, I have a plurality of banks 41–50 of memory devices, for instance polarized relays, interposed between the flip flops of register 12 and the matrices 14–24. There is one relay bank for each matrix, hence, one relay bank for each character. Each bank has one relay for each flip flop of register 12. Cable 30 from the register 12 diagrammatically represents the individual wires (some shown in FIGURE 2) from the output terminals of the flip flops, and the information signals conducted over these wires are fed in parallel to each relay bank, although, as will be later seen, only one bank is operative at a time. The purpose of each bank of relays is to establish wiring connections between register 12 and a resistor matrix for each different character coming into the field of view of the scanner. After the wiring connections are made, the relay banks become inactive so that the reading machine can operate without continual actuation and readjustment of the relays. When the relay banks have been actuated, the information signals on the wires of cable 30 are variously routed through the switch sections (described later, FIGURE 2) of the relays over the conductors of cables 31–40 (FIGURE 1) to the matrices 14–24.

FIGURE 2 shows relays 70–74 of bank 41 connected to flip flops 1*c*–5*c* inclusive, it being understood the remaining ten relays (not shown in FIGURE 2) are connected to the remaining flip flops (shown in FIGURE 1) in the same way. Flip flop 1*c* has two output wires 76 and 78 (termed "assertion" and "negation" wires in Patent No. 3,104,369). Wire 76 is connected to the coil of polarized relay 70, and wire 78 is connected to contact 94 of the relay switch section. Jumper 92 connects wire 76 to contact 93 of the relay switch section. Thus, the assertion and negation wires 76 (via jumper 92) and 78 are connected to the switch section terminals of the relay, while the assertion wire 76 only is used to energize the coil of the relay. A common lead 88 is connected to the coils of all of the relays of one bank (e.g. bank 41), and there is a manual control switch 52 in the common lead 88.

Continuing again with the example of the character "1" as shown in FIGURE 1, when it is scanned, flip flops 1*b*–5*b*, 5*a* and 5*c* will be set and the others will remain inactive (as described previously). Of the flip flops shown in FIGURE 2, flip flops 1*c*–4*c* will remain inactive, and flip flop 5*c* will be set. When set, the upper output wire will conduct a positive signal, say +6 v. and the lower will conduct a lower voltage or a negative voltage, for example −6 v. Switch 52 goes to ground, so that when the switch 52 is manually closed, the relays 70–74 (and all others in bank 51) operate, moving the contactors 70*a*–74*a* thereof up or down (the way shown) depending on the polarity of the input signal to the coils of the relays. In the illustration (FIGURE 2) contactor 70*a* will move to contact 94, and relays 71, 72 and 73 will be similarly actuated because the signals on the input line 76 are negative. However, since the scanner at position 5*c* saw "black," the upper wire 76*a* of flip flop 5c conducts a positive signal thereby causing the contactor 74a to engage contact 93b.

The contactors 70a–72a have wires 80–85 (in cable 31, FIGURE 1) extending to resistors 1c–5c of matrix 14, which, in the "1" example is being wired for the "1." The other resistors 1a–5a and 1b–5b have wires (not numbered) extending therefrom which would be connected to the relays 1a–5a and 1b–5b (shown only in FIGURE 1) to wire the remaining resistors of matrix 14 with the remaining points of the register 12. After the "1" matrix is wired by having the contactors of the relays in their adjusted positions (for flip flop 1c, for example, effectively continuing wire 76 or 78 via wire 80 to resistor 1c of matrix 14) subsequent scanning of another "1" will satisfy all inputs to the resistors of matrix 14 by way of all wires 76 or 78, the contactors of the relays, and all wires, including 80–85, in cable 31.

In this form of my invention, a character is presented to the view of the scanner, and the operator closes the switch 52 to set the relays of one bank to establish wiring in accordance with the shape of the character. Then, when the next character is seen by the scanner, the operator closes the next switch 52a (FIGURE 1) to operate the relays of bank 42. Meanwhile all other banks of relays remain inactive. This operator-controlled procedure is continued by successively operating switches 52b-52i, until all characters have been wired in the machine.

Thereafter, the reading machine is operated in the usual way, just as though the relay banks had established permanent wiring connections to the matrices. When each character is scanned the machine provides a "read" signal which triggers comparator 26 to compare the voltages on the matrix output lines 14a–24a and select the optimum signal as a character-identification signal.

*Semi-automatic system*

My semi-automatic system is the same as my manual system, except for the way that the successive relay banks are operated. In the manual system the machine operator is required to close switches 52–52i. In the semi-automatic system the machine operator can still do this, but he has the further choice of using a stepping switch 54 operated by an indexer or stepper 56. In situations where the documents to be read have a line of sample characters or where a sample line can be prepared, it may be exposed to the scanner 10 so that the characters are fed one-by-one to the machine. For example, assume that the machine is expected to read the ten digits 1, 2, 3 . . . 9, 0. A sample line containing these characters is first scanned to wire the resistor matrices in accordance therewith.

When the first character, e.g., the "1" is scanned, the machine provides a "read" signal on line 28 (FIGURES 1 and 2) which is conducted to stepper 56 by way of relay 64 and line 55. The stepper operates the switch 54 bringing its contactor 58 to position "1." The contactor is connected to ground so that it functions the same as switch 52 as far as relay bank 41 is concerned. Switches 90 (FIGURE 2), there being one in each line 88, connect the switches 52–52i in parallel with stepper switch 54 so that either is effectively connected in the system depending on the desires of the operator.

When the succeeding characters 2, 3, 4, etc. are scanned, there will be accompanying "read" signals on line 28, and these will sequence switch 54 to activate the successive relay banks to wire additional matrices. When the stepping switch has stepped to contact 60, all of the relay banks will have been used, and the contactor 58 establishes a ground connection over line 63 for relay 64 and its energizing circuit 62. When circuit 62 is closed, the relay 64 operates to open its switch section to which lines 28 and 55 are connected. Thus, subsequent "read" signals do not operate stepper 56. When the operator wants to again program the machine for any reason, he need only close switch 66 which is in parallel with the switch section of relay 64 so that one of the "read" signals steps contactor 58 off contact 60. Of course, the same result can be obtained by a substitute "read" signal applied directly to stepper 56.

*Automatic system*

The previous description pertains to rather simple forms of my invention which have application wherever there is knowledge of the font and where there is available a sample containing all characters that the machine is expected to read. In some instances fonts are intermixed. Many legal documents, books and records would fall within this category. In that case, I may use an automatic system for wiring the reading machine. In my automatic system, i.e., where no test characters are first presented to the scanner of the machine to wire the individual matrices, I have provided means to prevent successive resistor matrices from becoming wired to suit identical characters which happen to occur before all characters have been seen by the scanner. For instance, assume that the first word of the document 100 (FIGURE 3) is "LLAMA," whose first two characters are identical and whose third and fifth characters are also identical. With regard to FIGURE 3, I have shown scanner 102 which is a "line scanner" meaning that vertical lines are scanned one after the other to gather information regarding the configuration of each character and its background. The scanner 102 may be identical to the scanner disclosed in Patent No. 3,104,369 and for simplicity, it is assumed that all control circuitry for the scanning of characters shown in that application may be used in connection with scanner 102. I have provided means which enable the resistor matrices to be wired in the following way: (a) The first character presented to the view of the scanner ultimately triggers the first relay bank 119 to wire resistor matrix 104 in a manner peculiar to the configuration of that character. (b) The second character coming into the view of the scanner, though, does not finally wire the second matrix 106 unless the second character is different from the character which caused the resistor matrix 104 to become wired. (c) The third character will cause matrix 108 to become finally wired only if it is different from all previous characters. Thus, continuing with the example "LLAMA," matrix 104 will be wired for the character "L," matrix 106 for the character "A" and matrix 108 for the character "M." The means for doing this are described in detail later.

Considering now the construction and operation of the system shown in FIGURE 3a, it is to be understood that this is a partial illustration showing only five matrices, relay banks, etc. and that there are many more identical subassemblies in the system. In use, the scanner provides outputs which are gated into the columns a, b and c of register 116 the same as the gating of the scanner outputs described in Patent No. 3,104,369. The information output cable 118 from register 116 contains conductors from each point of the matrix 116, and all of them are applied to each of the relay banks 119, 120, 121, 122, 123, etc., there being one relay bank for each resistor matrix. Stepper 131 sequences the relay banks just as the stepper and switch of FIGURES 1 and 2, but it does not respond to the "read" signals as in these figures. The output cables 125, 126, 127, 128 and 129 from the relay banks contain conductors, i.e., one conductor for each resistor of the matrix service by its relay bank, just as partially shown in FIGURE 2.

The output lines 130–138 of matrices 104–112 are connected to comparator 114 which is gated by the "read" signal on line 115. The comparator output lines 130a–138a inclusive are character-identity wires, the one identifying a character conducting a signal while the others do not. The comparator in Patent No. 3,104,369 may have a "doubles" detection circuit (as in the Holt 3,160,855 entitled Doubles Decision Detector for Reading Machines) which rejects a character (schematically shown as a reject signal line 200) if the machine decides that the examined character is too similar to more than one character criteria to safely decide its identity. I have a circuit like this at 139, and I will describe later how it (or its equivalent) pertains to my present system.

Assume now, that the reading machine is ready to read a document 100 (FIGURE 3) whose first word is "LLAMA." The machine operator closes the necessary switches (not shown), one of which provides a "start" signal on line 141 which is OR gated at 142 to the stepper 131, thereby activating its first stage. The stepper is shown (FIGURE 3*c*) as a relay counter, but its purpose is the same as the stepper switch 54 of FIGURE 2; it establishes a ground connection over line 144 for the relays of bank 110. The relays of stepper 131 also serve other purposes, but these are described later. For the present, it is understandable that relay 1 of counter 131 enables the relays of bank 110 to be activated to wire matrix 104 in accordance with what is stored in register 116, i.e., the first "L" in "LLAMA." Also, the "L" is recognized by the matrix 104 providing a high (e.g. +6 v.) match voltage on line 130 to comparator 114. The character identity is finally established by a signal on line **130*a* of the group 130*a*–138*a***.

Level detectors, e.g., Schmidt triggers, voltmeters, or one shot multivibrators **130*b*–138*b* inclusive are connected to the respective matrix output lines 130–138 to ascertain whether the scanned character is being recognized or not. For instance, if a +6 v. signal is considered a perfect match voltage, I can require a match voltage signal to be a minimum of +5 volts to identify a character. Thus, the multivibrators will then have a threshold of +5 volts. For the first "L," there will be no question but that the signal on line 130 will be +6 volts, since resistor matrix 104 has been set up to produce this. Accordingly, the one shot 130*b* will fire, providing a signal on line 130*c* to exclusive OR gate 146. By definition, the gate 146 will produce a signal on line 148 to OR gate 142 which steps the stepper 131 to stage 2, turning off stage 1**. The details of the exclusive OR gate are shown (described later) in FIGURE 3*b*. Its function is to provide an output on line 148 if one, and only one, of its inputs are satisfied.

Now consider the operation when the second "L" of "LLAMA" is scanned and stored in register 116. The stepper 131 has already stepped to stage 2 thereby providing a ground path over line 150 for all relays of bank 120. Consequently, matrix 106 is wired for the second "L" of "LLAMA," but this is temporary. The second "L" not only will cause a +6 v. signal to occur in line 132 from matrix 106, but also a high correlation signal will appear on line 130 because the matrix 104 is wired to recognize the first "L" of "LLAMA." Therefore, both one shot multivibrators **130*b* and 132*b* will provide signals on their output lines 130*c* and 132*c*. Since the gate 146 will see two inputs simultaneously, neither will pass and as a result, the stepper 131 will not step to stage 3** even though the third character "A" of "LLAMA" is ready to be scanned.

When the "A" is scanned and the scan data is stored in register 116, stage 2 of stepper is energized, so that relay bank 120 (and no other) is prepared to direct the signals to matrix 106. The signals will be for the "A," providing an output signal on line 132 of +6 v. Although relays of bank 119 were not adjustable during the scanning of the "A," their information conducting switch sections conduct the "A" information to matrix 104, providing a poor output signal on line 130, i.e., less than the threshold voltage of the multivibrator **130*b*. Thus, the "A" is identified by the comparator 114 producing an identity signal on line 132*c*. Since only multivibrator 132*b* fired, exclusive OR gate 146 accepts the single input and provides an output on line 148 to step the stepper to stage 3**.

The next character is "M," and the relay bank 121 will cause the matrix 108 to be wired with the register 116 in accordance with the "electronic image" of the "M" stored in the register. The output signal on line 134 of matrix 108 will be +6 v., and the signal of the matrix output lines 130 and 132 will be below the multivibrator (130 and **132*b*) threshold. Accordingly, only line 134*c* from multivibrator 134*b* will conduct a signal to OR gate 146. As before, the signal on the gate output line 148 will step the stepper, but this time to stage 4**. This same procedure will continue for the other characters of the document, i.e., if a matrix has not already been wired for each character as it is reached, one will be finally wired for it. Consider now, the construction of two components of my system which are not in common use.

The exclusive OR gate 112 can be made in several ways, one of which is shown in FIGURE 3*b* for three inputs, A B, and C respectively. The Boolean algebra symbols A, B and C, described the desired conditions. The AND gates 158, 160 and 162 are each satisfied when the conditions stated by legend on the drawing are satisfied, providing an output gate 164 which is conducted on line **148*a*. The effect of the gating is to require one, and only one input (A or B or C) to produce a signal on line 148*a*. Of course, gates 158, 160 and 162** would be cascaded so that there is one such gate for each resistor matrix output line.

The stepper 131 (FIGURE 3*c*) is made of relays, each with a switch section going to ground to provide a path for the respective relay banks 119, 120, 121, etc. In addition, each relay has another switch section which is connected to a signal source, e.g., over lines 166, 168, 170, 172, 174 (FIGURES 3*c* and 3*a*). These signals are used with the "doubles" detection circuit 138 which is described later. The relays are successively activated by having a normally closed switch, e.g., switch 176 in the line 148, and a coil 178 for each switch, going to ground and connected with one of the signal source lines, e.g., line 166 (FIGURE 3*c*). Thus, when stage 1 relay is operated, it provides a signal on line 166 to control the output of circuit 139 as will be described below, and also open switch 176. Then, when the next signal occurs on line 148 it operates the relay for stepper stage 2, by being conducted from switch 176 over line 190 to relay No. 2. This same procedure continues for all stages of stepper 131.

Patent No. 3,160,855 entitled Doubles Decision Detector for Reading Machines, describes a doubles detector providing a signal, e.g., on line 200, which may be used for a number of purposes, an important one being to inhibit the reading of the character which caused the doubles situation. If I allowed the doubles detector 139 to operate during the period that the relay banks 119–123 etc. are used to wire matrices 104–112, etc., each time that a previously read character is encountered, e.g., the second "L" in "LLAMA," the doubles detector would operate to inhibit the identity of this character.

Accordingly, I have means to inhibit the output signals of the doubles detector as long as the relay banks 119–123 etc. are in operation. These means consist of OR gate 202 whose inputs are the signal line 166–174, etc. from the stages of stepper 131. The output of gate 202 provides a signal on line 206 to inhibit the gate 208 whose only other input is doubles signal line 200. Thus, doubles signals on line 200 will be inhibited until the stepper 131 has stepped beyond its final stage. If it is desired to have operator-control over the doubles detector actuation, a switch 207 may be interposed in line 206 to simply open or close this line. For instance, if the machine is capable of identifying one hundred characters and is used to recognize only numerals, after the first eighteen or twenty matrices have been wired, the machine operator may wish to use the doubles detector. In that case, the switch 207 on line 206 would simply be opened to disable the inhibit function of gate 208.

Instead of temporarily disabling the doubles detector during the period of machine operation described above, by ordinary gating I can use the reject signal on line 200 to allow only one of the two signals on a pair of the lines **130*a*–138*a*** to pass. In such an arrangement the remainder of my system would operate the same as described herein.

If the reading machine does not have a doubles detector, lines 166–174 are not necessary (but they could be used to operate an indicator for the operator to keep track of which and/or the number of matrices being wired).

In my automatic system it will be apparent that we do not know which of the comparator output lines **130*a*–138*a* identify which characters. However, this can be determined by visual comparison of document characters and observing the character-identity line for each, or I can rely on the frequency table to determine the identity of the characters on each line 130*a*–138*a*. The frequency table for the English language is well established. By having counters 180 (which are electrically operated by the signals conducted on the output lines 130*a*–138*a*** etc.) I keep count of the number of characters that each comparator output line identifies and from this number determine the identity of the characters.

In my automatic system where the matrices are wired "to order" of the characters being read, there are some interesting advantages. Only those characters appearing on the documents will be wired into the machine. Thus, the distinction between alpha numeric machines, machines for numerals only, machines for given fonts (including language style and proportions) all disappear. The machine wires its matrices to subsequently recognize the forms which it sees for the first time. An ordinary map matching machine probably would not recognize a 3 x 5 "A" if it is designed to recognize a 4 x 9 "A." The way my machine operates, though, the machine has two choices (a) to recognize both "A's" with a single resistor matrix, or wire a separate matrix for each of the "A's." Since the matrices are wired, to order of the characters, it is likely that many characters never will be wired, for failure to appear in a given "run" of documents. For instance, in English print, the capital "X" does not appear very often, nor does the capital "Z." In a conventional reading machine provision would have to be made for these little-used characters.

Many variations, changes and deviations in the construction and mode of operation of my invention may be made without departing from the protection of the following claims. For example, the description is concerned only with optical reading machines, but the principles of the invention apply equally to reading machines for magnetic characters.

I claim:

1. In a character reading machine having a character examination device which provides outputs indicating the presence of portions of the character at known locations of an area containing the character and its background, decision means including a plurality of data processing means, means responsive to said outputs for uniquely wiring individual data processing means to correspond to said outputs for given characters in a manner corresponding to that which they appear in the view of the character examination device and for retaining the unique wiring after which subsequent outputs fail to effect the wiring of said individual data processing means.

2. In a character reader for characters on an area, a character examination device providing outputs indicating the presence of portions of the character and its background at particular points including within the total area of the character and its background, a decision section having a plurality of outputs summarizing means, and self wiring means responsive to said examination device outputs to establish an arrangement of conductive paths to one said summarizing means in accordance with the configuration of a first character in the view of the examination device and then establish another arrangement of conductive paths to other summerizing means for the succeeding character coming into the view of said examination device, and said conductive paths being retained for each character initially in the view of said examination device after which subsequent similar characters seen by said examination device have no effect on the actuation of said self wiring means.

3. The reader of claim 2 wherein said summarizing means are resistor matrices, and said self wiring means include a plurality of groups of memory devices.

4. In a reading machine having a register to store the image of a character and its background, and a data processing matrix for each character of a plurality of characters, the improvement comprising electrically operative means responsive to the image configuration stored in said register for establishing circuit paths between points of said register which have the character image stored therein and corresponding points of one of said matrices and also for retaining said paths for identifying subsequent characters similar to the character which caused said paths to be established.

5. In a character reading machine, a register to successively store the images of characters, a plurality of correlation matrices, and means responsive to successive images stored in said register for wiring individual matrices with said register in accordance with the successive initial images of characters and for retaining the matrices wired for subsequent character readings.

6. The machine of claim 5 and said wiring means being operative to finally wire individual matrices only if there have been no preceding matrices wired for a given character.

7. The reading machine of claim 5 wherein said wiring means include a group of control members, individual members of said group connected to individual points of said register, individual conductors connected to said members and separate elements of one of said matrices, and means to actuate said control members such that each of said points storing a part of said character image causes the conductor connected with said control member to be connected with the corresponding point of said register and to remain so connected.

8. The reading machine of claim 7 wherein each matrix is a resistor matrix, and said control members are polarized relays, and said conductors are connected to the switch sections of said relays and the resistors of said resistor matrices.

9. A self-wiring reading machine comprising a register adapted to store successive images of successive characters and provide electrical outputs from points of the register which store data corresponding to parts of the image and the background of the image, a plurality of correlation matrices to summarize said electrical outputs, and means responsive to at least those outputs of said devices which have stored data corresponding to parts of an image of a character for establishing conductive paths between the register and individual points of one of said correlation matrices to correspond to the configuration of the image stored in said register, and means for retaining the established paths for use in identifying subsequent characters.

10. In an optical reading machine for characters on a contrasting background; a scanner for the characters and their background, said scanner providing outputs peculiar to the background and character respectively at individual points of the area containing the character being scanned; means responsive to said outputs to store an image of said character and the background thereof, said storing means having further means to provide outputs signifying the presence of portions of the character and the background respectively at individual points of said entire area; individual signal summarizing means for each character to be recognized, each summarizing means having a plurality of elements; and means responsive to at least those points of said storing means which provide outputs indicating the presence of points of the character which is stored therein, for establishing circuit paths between said storage points of said storage means and elements of said signal summarizing means for one character, and for maintaining said paths to be used in identifying subsequent similar characters.

11. In a reading machine for characters on a contrasting background; a scanner for the characters and their background, said scanner providing outputs peculiar to the background and character at individual points of the area containing the character being scanned; means responsive to said outputs to store an image of said character and the background thereof, said storing means to provide outputs signifying the character and the background respectively at individual points corresponding to points of said entire area; individual signal summarizing means for each character to be recognized, each summarizing means having a plurality of elements; means responsive to the outputs from those points of said storage which provide outputs indicating the presence of the character image which is stored therein, for establishing circuit paths between said storage points of said storage means and elements of said signal summarizing means for one character; control means for said circuit path establishing means for one character; control means for said circuit path establishing means, said control means rendering a portion of said path establishing means operative for one character and one signal summarizing means, and rendering another portion of said circuit path establishing means and a second output summarizing means operative for a second character when its image is stored in said storage means, and means operatively connected with said control means for enabling said control means to provide said circuit paths between said storage means and said second signal summarizing means on condition that the second character is different from the first character.

12. The subject matter of claim 11 wherein there are decision means connected with each of said signal summarizing means to provide an output for each recognized character, and tabulating means for said decision means output whereby the tabulations may be compared to a character frequency table from which the specific characters identified may be deduced.

13. In a reading machine system having means providing outputs which correspond to discrete points of an area containing a character, said outputs being characteristic of the character and its background respectively so as to be distinguishable therebetween, individual means for each character to summarize said outputs and provide signals in accordance with the summary of said outputs for a given character and its background area, the improvement comprising electrical means responsive to said outputs for establishing wiring connections with a first of said individual means for a single character with the wiring connections being peculiar to the configuration of said single character, control means for said wiring connection establishing means for establishing further wiring connections between a second of said individual means and the outputs of said providing means where the said wiring connections for the second of said individual means are peculiar to the individual points of the said second character and its background.

14. In a reading machine for a set of characters, examining and register means providing outputs identifying each point of an area containing a character with some of said outputs indicating the presence of the character and other of said outputs indicating the presence of the character background, a plurality of banks of adjustable devices, a plurality of signal summarizing means, there being at least one signal summarizing means for each of said banks of devices, control means to render said banks successively operative in accordance with the storage of successive character areas in said register means, each of said banks of devices including means for adjusting the devices thereof to one position for each point of said register means whose output signifies the presence of a portion of the character, and means establishing conductive paths from the last mentioned devices to one of said signal summarizing means after which said devices of one of said banks remain in the adjusted position so that when a character similar to the character area stored in said register means which caused the devices of said bank to be so adjusted appears on said register means, the signal summarizing device which has been wired as aforesaid will be used to recognize the said similar character.

15. The subject matter of claim 14, and means operatively connected with said banks of relays to control said relays in a manner that said signals summarizing devices will be rewired under the control of said control means in order to condition the machine to recognize a different set of characters.

16. In a reading machine system, means providing outputs peculiar to the configuration of a character and its background area with each output signifying the presence of a part of the character or the presence of the character background for specific points of said area, individual output processing means for each character expected to be recognized, means for establishing circuit paths and retaining said circuit paths between said output providing means and successive processing means for each of a group of characters which are sequentially investigated as to configuration after which said circuit path establishing machine means become ineffective and the reading machine is capable of functioning without adjustment of said circuit path establishing means.

17. In a character reading machine for a plurality of different sets of characters depending on the set which is presented to the machine, means for scanning each character of any set in turn, means for producing a unique set of electrical signals for each character of the presented set, means for storing and retaining a representation of each set of signals for subsequent comparison with the signals produced by each of said characters to identify subsequent characters which produce similar sets of electrical signals, and means to change said stored and retained representations by presenting another set of characters to the machine.

18. In a character reading machine, means for presenting information regarding a set of characters to the machine, means for scanning each character in turn, means for producing a unique set of electrical signals for each character, means for storing a representation of each set of signals for subsequent comparison with the signals produced by each of said characters to identify subsequent characters which produce similar sets of electrical signals, and means for inhibiting said storage when a similar representation of a character signal has been previously stored, until a separate storage for each different character is established.

19. In a character reading machine, an examination device to examine a character and provide a set of signals which correspond to the character, temporary storage means to store a representation of said set of signals, a plurality of correlation devices, control means operative to connect a first correlation device with said temporary storage means in a manner to correspond to said stored representation to thereby condition said first correlation device for use in identifying a subsequent character similar to the character whose representation was stored, and said control means thereafter operative to connect additional correlation devices with said temporary storage in a manner to correspond to subsequent stored representations of different characters examined by said examination device to thereby condition said additional correlation devices for use in identifying subsequent characters similar to said different characters.

20. The character reading machine of claim 19 wherein said control means include a selector circuit assembly which becomes operatively associated with said correlation devices in a sequential order.

21. The character reading machine of claim 20 and means associated with said selector circuit assembly and said correlation devices to inhibit the connection of a correlation device with said temporary storage means when a correlation device has been previously connected for a said set of signals similar to the set whose representation is being used to connect the correlation device.

References Cited by the Examiner

UNITED STATES PATENTS

| | | | |
|---|---|---|---|
| 2,682,043 | 6/1954 | Fitch | 235—61.11 |
| 3,074,050 | 1/1963 | Schultz | 340—146.3 |
| 3,174,032 | 3/1965 | White | 235—181 |

MALCOLM A. MORRISON, *Primary Examiner.*

DARYL W. COOK, *Examiner.*

J. E. SMITH, *Assistant Examiner.*